US010469439B2

(12) United States Patent
Friedland et al.

(10) Patent No.: US 10,469,439 B2
(45) Date of Patent: Nov. 5, 2019

(54) INTERACTION BAR FOR REAL-TIME INTERACTIONS WITH CONTENT ON A SOCIAL NETWORKING SYSTEM

(71) Applicant: Facebook, Inc., Menlo Park, CA (US)

(72) Inventors: Jeremy Samuel Friedland, San Francisco, CA (US); Robin Maxime Clediere, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 233 days.

(21) Appl. No.: 15/485,179

(22) Filed: Apr. 11, 2017

(65) Prior Publication Data

US 2018/0295090 A1 Oct. 11, 2018

(51) Int. Cl.
*G06Q 50/00* (2012.01)
*H04L 12/58* (2006.01)
*G06Q 10/10* (2012.01)
*G06Q 30/02* (2012.01)

(52) U.S. Cl.
CPC ............ *H04L 51/32* (2013.01); *G06Q 10/10* (2013.01); *G06Q 30/02* (2013.01); *G06Q 30/0241* (2013.01); *G06Q 30/0269* (2013.01); *G06Q 50/01* (2013.01); *H04L 51/046* (2013.01); *H04L 51/14* (2013.01)

(58) Field of Classification Search
None
See application file for complete search history.

(56) References Cited

U.S. PATENT DOCUMENTS

| | | | |
|---|---|---|---|
| 5,479,600 A | 12/1995 | Wroblewski et al. | |
| 8,743,151 B1* | 6/2014 | Fulcher | G06F 3/04817 345/684 |
| 9,146,656 B1* | 9/2015 | Srinivasan | G06F 3/0482 |
| 2013/0326352 A1* | 12/2013 | Morton | G06F 3/0484 715/719 |
| 2014/0059139 A1* | 2/2014 | Filev | G06Q 50/01 709/205 |
| 2014/0068689 A1* | 3/2014 | Sirpal | H04N 21/8173 725/109 |
| 2014/0280121 A1* | 9/2014 | Sharp | G06F 16/24578 707/732 |
| 2015/0256415 A1 | 9/2015 | Williamson et al. | |
| 2016/0269328 A1 | 9/2016 | Pola | |
| 2018/0041552 A1* | 2/2018 | Ormseth | H04L 65/1093 |

\* cited by examiner

*Primary Examiner* — Beau D Spratt
(74) *Attorney, Agent, or Firm* — Fenwick & West LLP

(57) ABSTRACT

A social networking system enables users to interact through a content item in real time by presenting an interaction bar to a user viewing a content item page associated with the content item. The social networking system presents the content item pages for content items along with a content item header. The content item header remains at a fixed position on the display of a viewing user's client device at the top of the display. If the social networking system receives an interaction with a content item, the social networking system can identify users who are viewing the content item page associated with the content item and present an interaction bar that describes the interaction in the content item header. To determine whether to present an interaction bar to a viewing user, the social networking system can calculate an affinity score of a viewing user for the interaction.

16 Claims, 8 Drawing Sheets

INTERACTION BAR FOR REAL-TIME INTERACTIONS WITH CONTENT ON A SOCIAL NETWORKING SYSTEM

BACKGROUND

This invention relates generally to social networking systems, and in particular to presenting interactions with content items in a social networking system in real time.

Social networking systems allow users to connect and interact with each other. In particular, many social networking systems allow users to add and interact with content items generated by other users of the social networking system. For example, users can interact with content on a social networking system by reacting to the content (e.g., "liking" the content item, "loving" the content item, indicating they think a content item is funny), adding additional content to the content item (e.g., posting a "comment" on the content item), and sharing the content item with other users of the social networking system.

Interactions with content items are often presented so that users can see how other users have interacted with the content. However, conventional social networking systems typically fail to notify users of new interactions with a content item in a timely manner. Thus, interactions with other users through interactions with a content item are not typically performed in real-time. Additionally, if a user is viewing the content item through a page associated with the content item, the user is typically unaware of new interactions with the content item because the user may be viewing a portion of the content item page that does not display the interaction. Thus, interacting real-time with other users through a content item is difficult for a user unless the user happens to be viewing the interaction at the time it is performed.

SUMMARY

A social networking system enables users to interact with each other through a content item in real time by presenting an interaction bar to a user viewing a content item page associated with the content item. The social networking system stores pages that present information associated with a content item, such as the content item or interactions with the content item from other users. The social networking system presents the content item pages along with a content item header. The content item header contains information about the content item, such as identifying information about the user who generated the content item or numbers of interactions with the content item. The content item header can remain at a fixed position on the display of a viewing user's client device at the top of the display. Thus, the content item header is visible to the viewing user as the viewing user is presented with different portions of the content item page. For example, if the viewing user views a new comment at the bottom of the content item page, the content item header is still displayed at the top of the client device display. The interaction bar may be presented near to when the interaction occurs. For example, the interaction bar may be presented as the interaction occurs, immediately after the interaction occurs, or some time period after the interaction occurs.

If the social networking system receives an interaction with a content item, the social networking system can identify users who are currently viewing the content item page associated with the content item and present an interaction bar to the users that describes the interaction. The interaction bar is presented to viewing users in the content item header and is similarly available to be viewed by the user no matter which portion of the content item page the viewing users is currently viewing. The interaction bar may identify the user who performed the interaction or the type of the interaction. To determine whether to present an interaction bar to a viewing user, the social networking system can calculate an affinity score of a viewing user for the interaction. If the affinity score exceeds a threshold, the social networking system presents an interaction bar describing the interaction to the viewing user. The affinity may be determined based on the viewing user, the type of the interaction, and the content item.

By presenting interaction bars to a viewing user describing interactions with a content item, the user is alerted to an interaction when the interaction takes place. This brings interactions to the user's attention that they may otherwise miss, and allows interacting with a content item to be a method for real-time communication between users. Additionally, by presenting the content item header at a fixed position on the client device display, the interaction bar can be presented to a viewing user no matter which portion of the content item page the viewing user is currently viewing, and therefore can bring new interactions with the content item to the attention of the viewing user more effectively.

DETAILED DESCRIPTION

Example System Environment and Architecture

Figure 1:
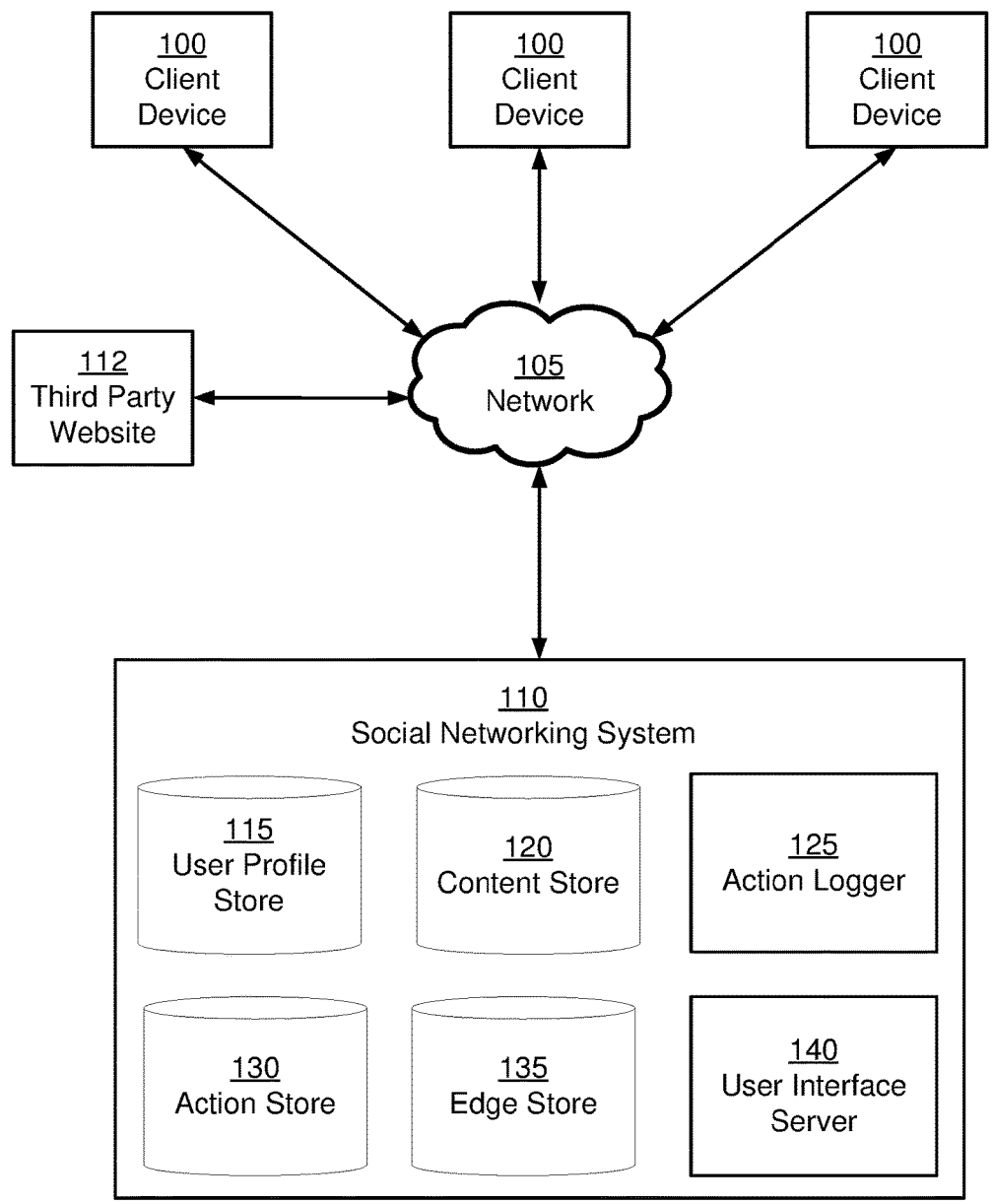
FIG. 1 illustrates an example system environment and system architecture for a social networking system, in accordance with some embodiments.

FIG. 1 illustrates an example system environment for a social networking system 110, in accordance with some embodiments. The illustrated system includes one or more client devices 100, a network 105, one or more third-party systems 112, and the social networking system 110 In alternate embodiments, the functionality of each component may be distributed differently from the examples described herein, and the system environment may include more, fewer, or different components than illustrated in FIG. 1. Additionally, each component may perform their respective functionalities in response to a request from a human, or automatically without human intervention. Furthermore, the embodiments described herein can be adapted to online systems that are not social networking systems.

The client devices 100 are one or more computing devices capable of receiving user input as well as transmitting and/or receiving data via the network 105. In one embodiment, a client device 100 is a conventional computer system, such as a desktop or laptop computer. Alternatively, a client device 100 may be a device having computer functionality, such as a personal digital assistant (PDA), a mobile telephone, a smartphone or another suitable device. A client device 100 is configured to communicate via the network 105. In one embodiment, a client device 100 executes an application allowing a user of the client device 100 to interact with the social networking system 110. For example, a client device 110 executes a browser application to enable interaction between the client device 100 and the social networking system 110 via the network 105. In another embodiment, a client device 100 interacts with the social networking system 110 through an application programming interface (API) running on a native operating system of the client device 100, such as IOS® or ANDROID™.

The client devices 100 are configured to communicate via the network 105, which may comprise any combination of local area and wide area networks employing wired or wireless communication links. In one embodiment, the network 105 uses standard communications technologies and protocols. For example, the network 105 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 105 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 105 may be represented using any suitable format, such as hypertext markup language (HTML) or extensible markup language (XML). In some embodiments, all or some of the communication links of the network 105 may be encrypted using any suitable technique or techniques.

One or more third party systems 112 may be coupled to the network 105 for communicating with the social networking system 110, which is further described below in conjunction with FIG. 1. In one embodiment, a third party system 112 is an application provider communicating information describing applications for execution by a client device 100 or communicating data to client devices 100 for use by an application executing on the client device. In other embodiments, a third party system 112 provides content or other information for presentation via a client device 100. A third party website 112 may also communicate information to the social networking system 110, such as advertisements, content, or information about an application provided by the third party website 112.

The social networking system 110 shown in FIG. 1 includes a user profile store 115, a content store 120, an action logger 125, an action store 130, an edge store 135, and a user interface server 140. Alternate embodiments may include more, fewer, or different components from those illustrated in FIG. 1, and the functionality of the components may be divided up differently from the description below. Additionally, conventional components such as network interfaces, security functions, load balancers, failover servers, management and network operations consoles, and the like are not shown so as to not obscure the details of the system architecture.

Each user of the social networking system 110 is associated with a user profile, which is stored in the user profile store 115. A user profile includes declarative information about the user that was explicitly shared by the user and may also include profile information inferred by the social networking system 110. In one embodiment, a user profile includes multiple data fields, each describing one or more attributes of the corresponding user of the social networking system 110. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 110 displayed in an image. A user profile in the user profile store 115 may also maintain references to actions by the corresponding user performed on content items in the content store 120 and stored in the action store 130.

The content store 120 stores objects that each represent various types of content. Examples of content types represented by an object include a page post, a status update, a photograph, a video, a link, a shared content item, a gaming application achievement, a check-in event at a local business, a brand page, or any other type of content. Social networking system users may create objects stored by the content store 120, such as status updates, photos tagged by users to be associated with other objects in the social networking system, events, groups or applications. In some embodiments, objects are received from third-party applications or third-party applications separate from the social networking system 110. In one embodiment, objects in the content store 120 represent single pieces of content, or content "items." Hence, users of the social networking system 110 are encouraged to communicate with each other by posting content items of various types of media through various communication channels. This increases the amount of interaction of users with each other and increases the frequency with which users interact within the social networking system 110.

The action logger 125 receives communications about user actions internal to and/or external to the social networking system 110, populating the action store 130 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action store 130.

The action store 130 may be used by the social networking system 110 to track user actions on the social networking system 110, as well as actions on third party systems 112 that communicate information to the social networking system 110. Users may interact with various objects on the social networking system 110, and information describing these interactions is stored in the action log 130. Examples of interactions with objects include: commenting on posts, sharing links, and checking-in to physical locations via a mobile device, accessing content items, and any other interactions. Additional examples of interactions with objects on the social networking system 110 that are included in the action store 130 include commenting on a photo album, communicating with a user, establishing a connection with an object, joining an event to a calendar, joining a group, creating an event, authorizing an application, using an application, reacting to an object ("liking" or "loving" the object, indicating that the object is funny or sad) and engaging in a transaction. Additionally, the action store 130 may record a user's interactions with advertisements on the social networking system 110 as well as with other applications operating on the social networking system 110. In some embodiments, data from the action store 130 is used to infer interests or preferences of a user, augmenting the interests included in the user's user profile and allowing a more complete understanding of user preferences.

The action store 130 may also store user actions taken on a third party system 112, such as an external website, and communicated to the social networking system 110. For example, an e-commerce website that primarily sells sporting equipment at bargain prices may recognize a user of a social networking system 110 through a social plug-in enabling the e-commerce website to identify the user of the social networking system 110. Because users of the social networking system 110 are uniquely identifiable, e-commerce websites, such as this sporting equipment retailer, may communicate information about a user's actions outside of the social networking system 110 to the social networking system 110 for association with the user. Hence, the action store 130 may record information about actions users perform on a third party system 112, including webpage viewing histories, advertisements that were engaged, purchases made, and other patterns from shopping and buying.

In one embodiment, an edge store 135 stores information describing connections between users and other objects on the social networking system 110 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 110, such as expressing interest in a page on the social networking system, sharing a link with other users of the social networking system, and commenting on posts made by other users of the social networking system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 110, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 135 also stores information about edges, such as affinity scores for objects, interests, and other users. Affinity scores, or "affinities," may be computed by the social networking system 110 over time to approximate a user's affinity for an object, interest, and other users in the social networking system 110 based on the actions performed by the user. A user's affinity may be computed by the social networking system 110 over time to approximate a user's affinity for an object, interest, and other users in the social networking system 110 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 135, in one embodiment. Alternatively, each interaction between a user and a specific object is stored as a separate edge. In some embodiments, connections between users may be stored in the user profile store 115, or the user profile store 115 may access the edge store 135 to determine connections between users.

The user interface server 140 links the social networking system 110 via the network 105 to the one or more client devices 100, as well as to the one or more third party systems 112. The user interface server 140 serves web pages, as well as other web-related content, such as JAVA®, FLASH®, XML and so forth. The user interface server 140 may receive and route messages between the social networking system 110 and the client device 100, for example, instant messages, queued messages (e.g., email), text messages, short message service (SMS) messages, or messages sent using any other suitable messaging technique. A user may send a request to the user interface server 140 to upload information (e.g., images or videos) that are stored in the content store 120. Additionally, the user interface server 140 may provide application programming interface (API) functionality to send data directly to native client device operating systems, such as IOS®, ANDROID™, WEBOS® or RIM®.

The user interface server 140 generates user interfaces, such as web pages, with content from the social networking system 110. The user interfaces are displayed to the user through a client device 100 and network 105. The user interfaces provided by the user interface server 140 allows a user to generate content items and interact with content items stored by the content store 120. For example, a user interface may provide a method for a user provide text, pictures, videos, links, and advertisements to be used to generate content items. The user interface server 140 configures a user interface based on the client device 100 used to present it. For example, a user interface for a smartphone with a touchscreen may be configured differently from a user interface for a web browser on a computer.

The user interface server 140 receives information from the action logger 135 about a user interacting with a content item. Upon receiving information about an interaction with a content item, the user interface server 140 identifies other users viewing the content item and presents an interaction bar describing the interaction to the users viewing the content item within a content item header on a content item page. A user viewing a content item page for a content item is termed a "viewing user." In some embodiments, the interaction bar identifies the user who performed the interaction and the type of the interaction. The interaction bar may be shown to a viewing user based on a measure of affinity of the viewing user for the interaction, which may be determined based on the affinity of the viewing user to various features of the interaction. The measure of affinity for an interaction may be based on the viewing user's affinity for the user who performed the action, the user who generated or posted the content item, the content item, and the type of interaction itself. Content item headers and interaction bars describing interactions with a content item are discussed further with FIG. 2-7.

Example Content Item Page User Interfaces

Figure 2:
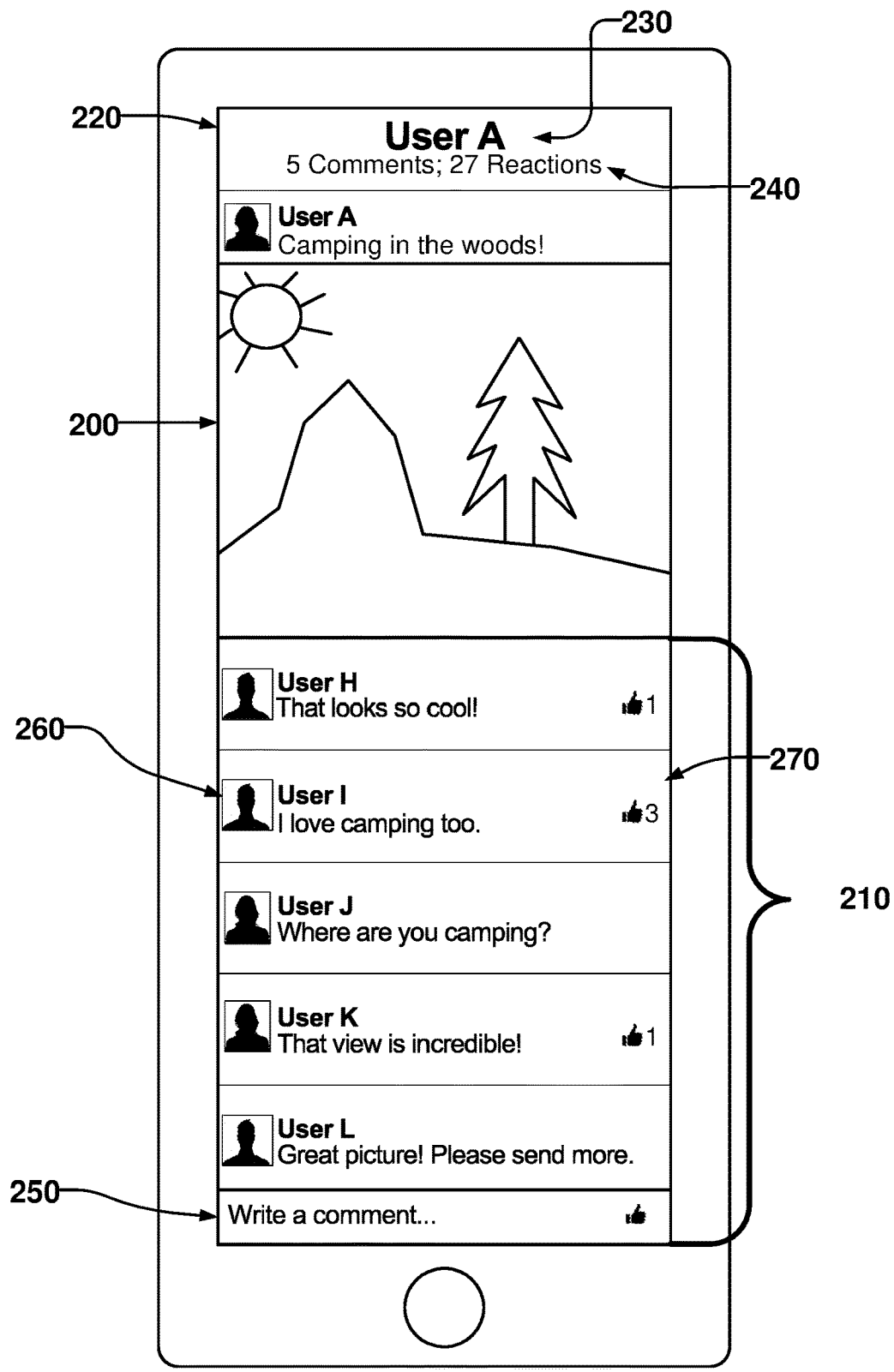
FIG. 2 illustrates an example user interface for a content item page, in accordance with some embodiments.

FIG. 2 illustrates an example user interface for a content item page, in accordance with some embodiments. The content item page presents the content item 200 associated with the content item page, as well as interactions 210 with the content item (e.g. reactions and comments). The content item page displays a content item header 220 that displays information about the content item. For example, the content item header identifies the user 230 who generated the content item, as well as numbers 240 representing how many comments and how many reactions users have posted to the content item. The content item header maintains a static position on a display of a client device such that, if the user scrolls further down the content item page, the content item header remains visible. Thus, the viewing user is able to view information presented in the content item header throughout the content item page.

The content item page also displays an interface 250 that allows a user to interact with the content item, e.g., by posting a comment or "liking" the content item. Each comment posted on the content item identifies the user 260 who posted the comment. Users can also interact with the content item by interacting with comments on the content item, and the content item page displays those interactions 270 with the comments, e.g. the number of "likes" a comment has received. In some embodiments, users can interact with comments in other ways, for example by replying to comments.

Figure 3:
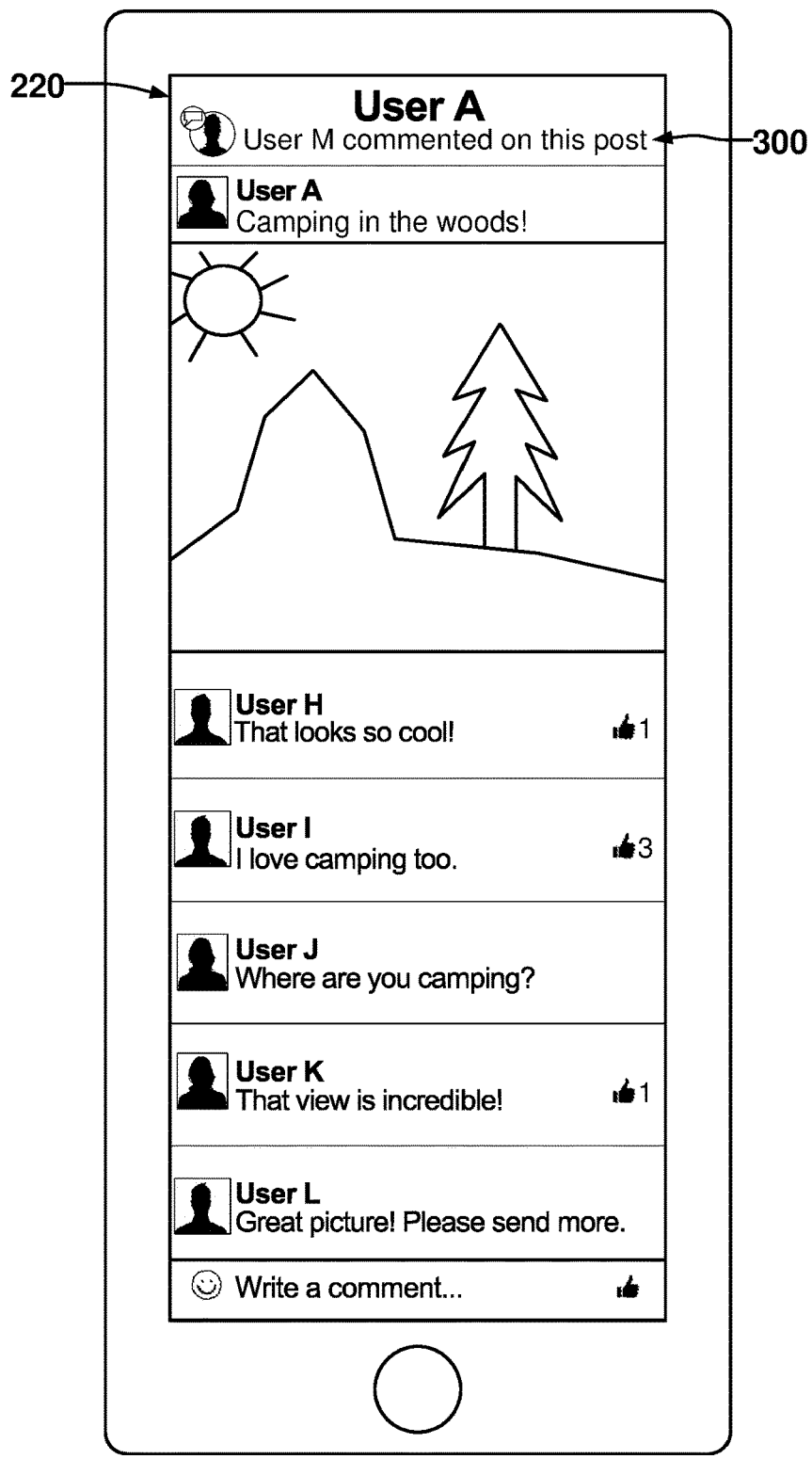
FIG. 3 illustrates an example user interface for a content item page that includes a content item header with an interaction bar, in accordance with some embodiments.

FIG. 3 illustrates an example user interface for a content item page that includes a content item header 230 with an interaction bar 300, in accordance with some embodiments. When the social networking system receives a new interaction with a content item while a viewing user is viewing a content item page, the content item header displays an interaction bar 300 describing the interaction. The interaction bar 300 can identify the user who interacted with the content item and what the interaction was. For example, FIG. 3 illustrates an interaction bar for User M's new comment on the content item, which includes User M's profile picture and an icon indicating that the interaction is a comment. In some embodiments, an interaction bar could represent multiple types of interactions from the same user. For example, if a user both commented on and liked a content item, a single interaction bar with the user's profile picture may be shown, and the interaction bar may have icons for both a like and a comment. In some embodiments, the interaction bar provides a preview of the interaction when it appears. For example, the interaction bar may display the text of a new comment when it appears. The interaction bar 300 may be presented near to when the interaction occurs. For example, the interaction bar may be presented as the interaction occurs, immediately after the interaction occurs, or some time period after the interaction occurs.

In some embodiments, an interaction bar may be displayed describing each interaction that takes place with the content item while the viewing user is viewing the content item page. In some embodiments, the social networking system displays an interaction bar to a viewing user based on an affinity score for the interaction. The affinity score can be determined based on the content item, the viewing user, the user who generated the content item, the user who performed the interaction, the type of the interaction, or content associated with the interaction. In some embodiments, the affinity score is based on whether the viewing user has previously interacted with the content item. A threshold for the affinity score may be used to determine whether to display an interaction bar. The threshold may be based on the number of previous interactions or the rate of interaction with the content item. For example, if there have been a large number of interactions within a short period of time, an interaction bar may only be shown to a viewing user if the interaction is performed by a friend of the viewing user.

In some embodiments, an interaction bar is only displayed for a period of time, after which the interaction bar is no longer displayed. The period of time for displaying an interaction bar may be based on the affinity score of the interaction for the viewing user or the rate at which interactions are being performed on the content item. If an interaction bar is displayed and another interaction occurs before the first interaction bar disappears, a second interaction bar describing the new interaction may replace the first interaction bar, or the second interaction bar may describe both interactions. In other embodiments, an interaction bar is displayed until the viewing user views the interaction. For example, if the interaction is a new comment posted on the content item, the content item page may display the interaction until the user scrolls to the new comment. In some embodiments, the viewing user may select the interaction bar 300 to be presented with the new interaction.

Figure 4:
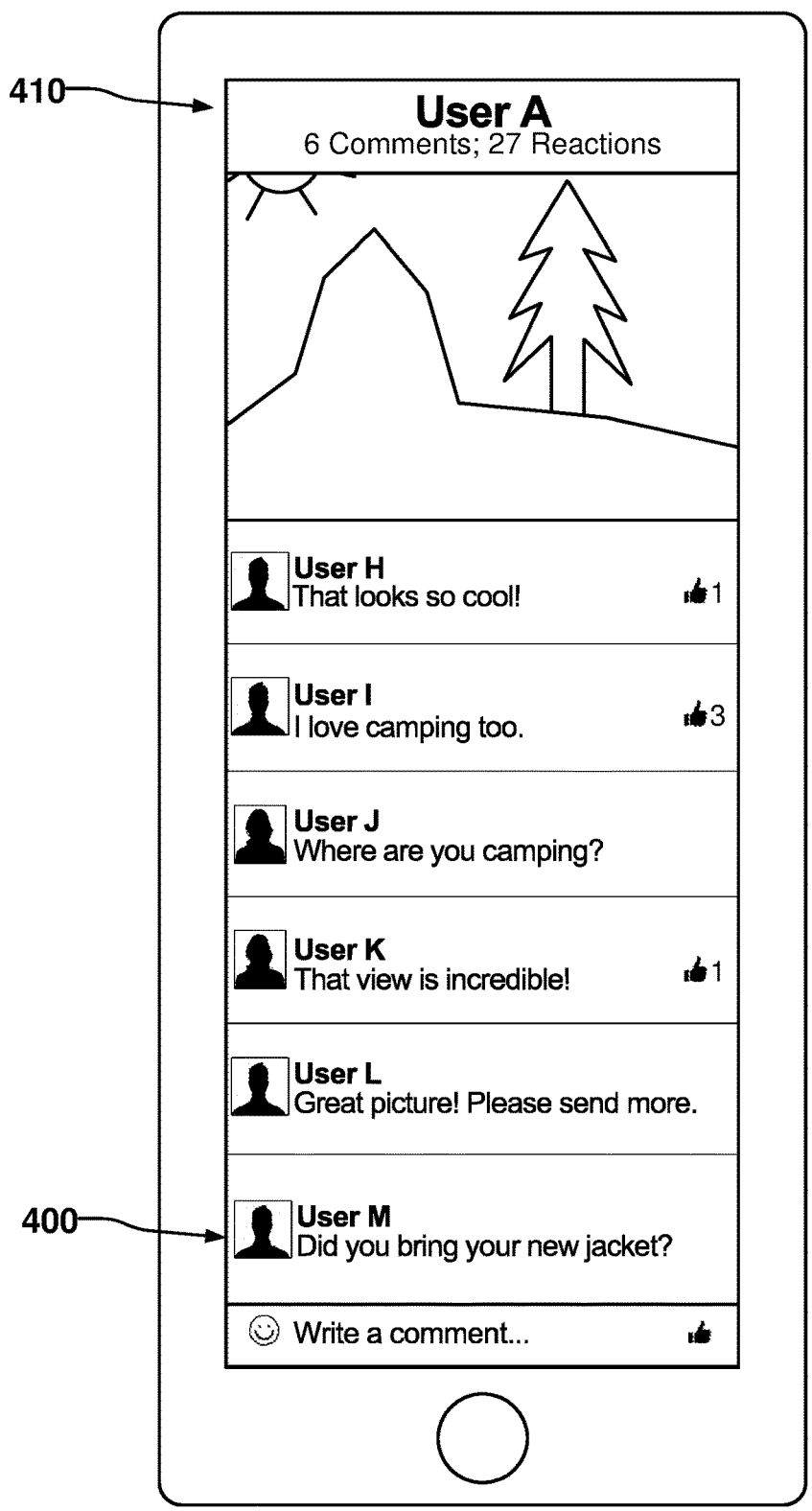
FIG. 4 illustrates an example user interface for a content item page that includes a new interaction with the content item, in accordance with some embodiments.

FIG. 4 illustrates an example user interface for a content item page that includes a new interaction 400 with the content item, in accordance with some embodiments. The new interaction 400 illustrated in FIG. 4 is the new interaction described by the interaction bar 300 in FIG. 3. The content item page illustrated in FIG. 4 also no longer displays the interaction bar associated with the interaction 400. As described above, the interaction bar may no longer be displayed in the content item header if a time period for presenting the interaction bar passes, or because the user has viewed the interaction on the content item page. Additionally, as described above, though the viewing user is no longer viewing the top of the content item page, the content item header 230 is still displayed to the viewing user.

Figure 5:
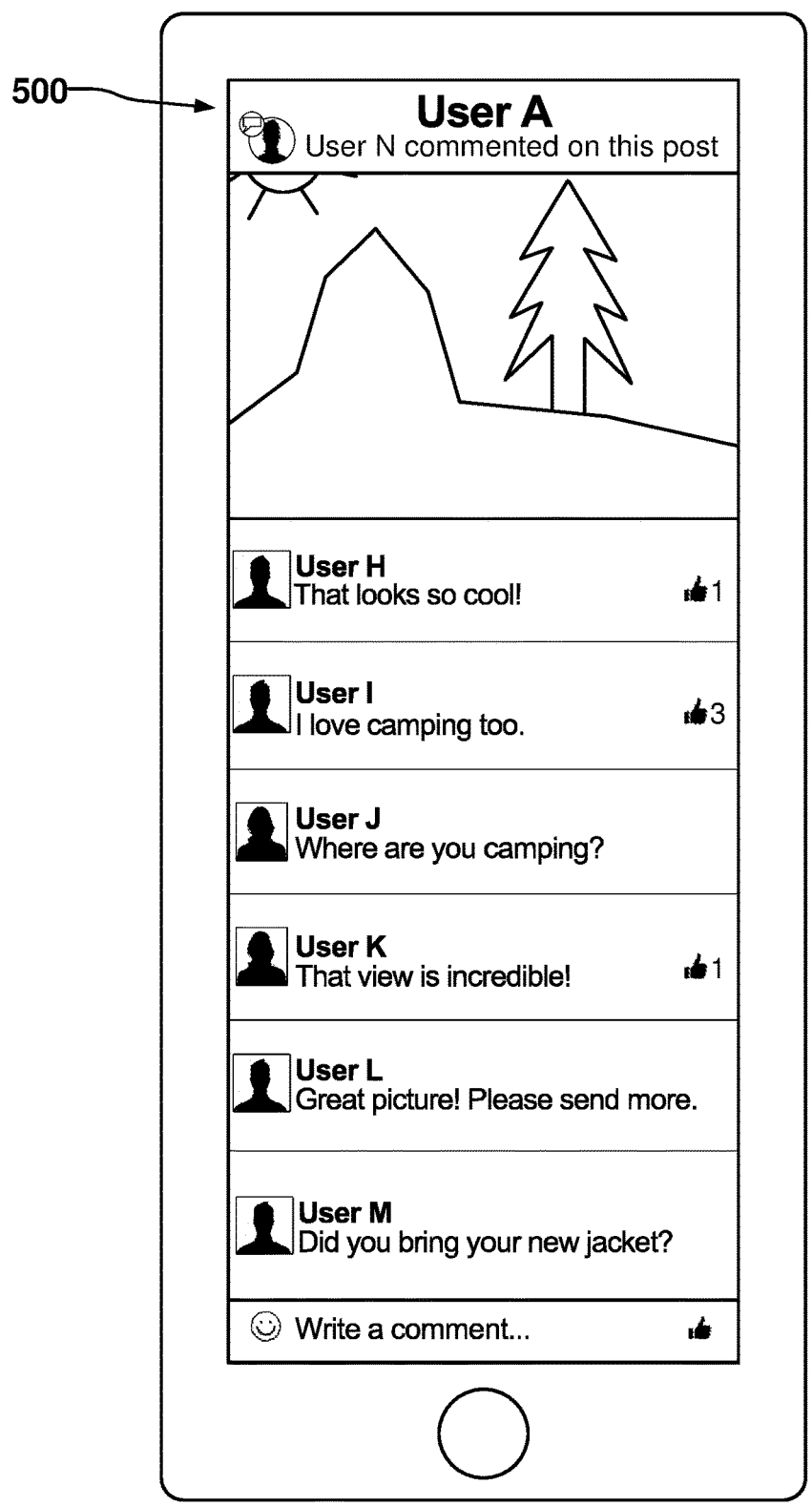
FIG. 5 illustrates an example user interface for a content item page with an interaction bar that is presented while the user is not viewing the top of the content item page, in accordance with some embodiments.

The content item header displays the interaction bar no matter which portion of the content item page the viewing user is viewing. For example, FIG. 5 illustrates an example user interface for a content item page with an interaction bar 500 that is presented while the user is not viewing the top of the content item page, in accordance with some embodiments. The social networking system may determine whether to display an interaction bar based on the portion of the content item page being presented to the viewing user. For example, if the viewing user is near the bottom of the content item page, the social networking system may be more likely to present an interaction bar describing a new comment to the viewing user so that the viewing user is inclined to view the new comment. In some embodiments, the social networking system presents the interaction bar if the viewing user is not viewing a particular part of the content item page, such as the top of the content item page, the content item, or a portion that describes interaction with the content item page.

Figure 6:
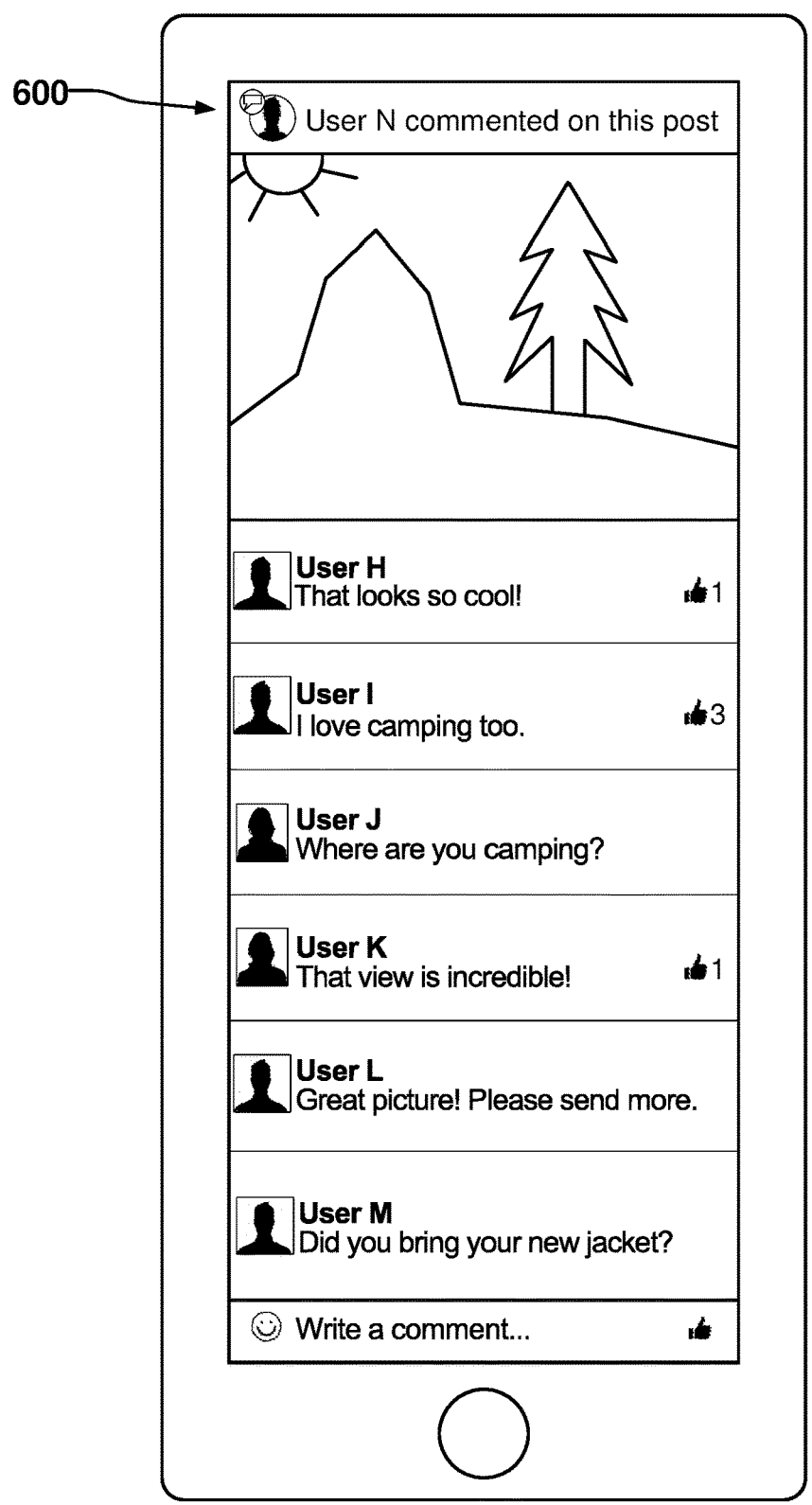
FIG. 6 illustrates an example user interface for a content item page with a reduced content item header, in accordance with some embodiments.

In some embodiments, the social networking system adjusts the content item header based on the portion of the content item page being displayed to the viewing user. For example, if the viewing user is viewing the top of the content item page, the social networking system may present an expanded content item header, such as the ones presented in FIGS. 2-5. However, the content item header may be reduced in size when the viewing user is presented with a portion of the content item page that does not include the top of the content item page. FIG. 6 illustrates an example user interface for a content item page with a reduced content item header 600, in accordance with some embodiments. The reduced content item header may identify the user who generated the content item (e.g., by presenting the profile picture of the user) or may display other information about interactions with the content item, such as the number of reactions or comments associated with the content item. In some embodiments, the reduced content item header rotates the information presented to the viewing user. For example, the reduced content item header may alternate between displaying an interaction bar and an identifier for the user who generated the content item. By adjusting or reducing the size of the content item header, interactions can still be brought to the viewing user's attention while making more of the content item page more visible to the viewing user.

Figure 7A:
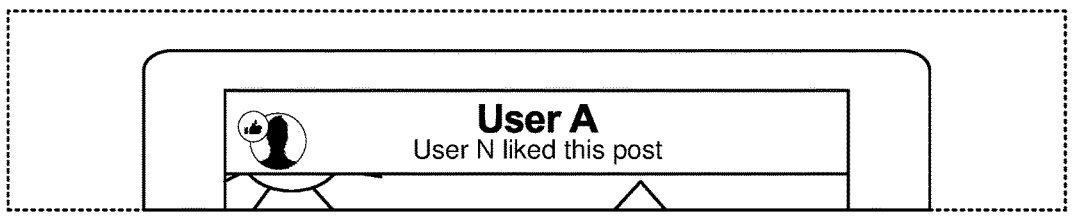
FIGS. 7A-7D illustrate alternative content item headers for a content item page, in accordance with some embodiments.
Figure 7B:
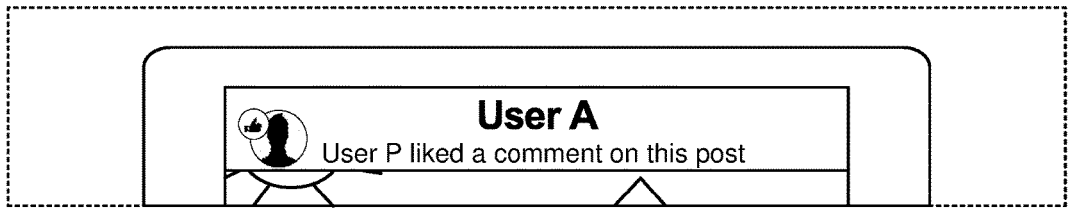

FIGS. 7A-7D illustrate alternative content item headers for a content item page, in accordance with some embodiments. FIG. 7A illustrates a content item header that includes an interaction bar describing a user who has reacted to the content item, in accordance with some embodiments. FIG. 7B illustrates a content item header that includes an interaction bar describing a user who has interacted with content posted on a content item, in accordance with some embodiments. In particular, the content item header describes a user who reacted to a comment posted on the content item.

Figure 7C:
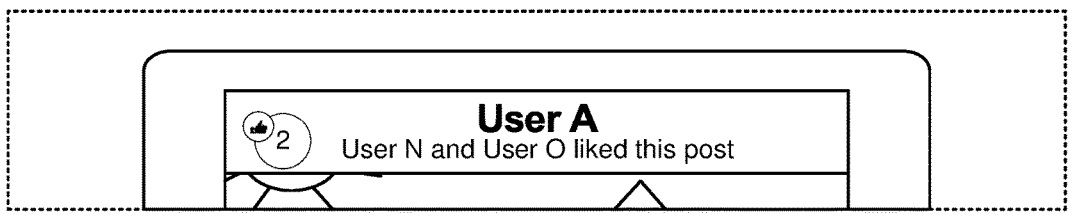

FIG. 7C illustrates a content item header that includes an interaction bar describing multiple interactions with the content item, in accordance with some embodiments. In these embodiments, if a content item receives many interactions of the same type within a given time period, the social networking system aggregates the interactions into one interaction bar. FIG. 7C illustrates an interaction bar that aggregates reaction interactions from two users. A threshold number of interactions may be needed to display an aggregated interaction bar. For example, the social network may require five interactions to occur in order to display an aggregated interaction bar; otherwise, individual interaction bars may be shown. The aggregated interaction bar shows a count of the number of interactions associated with the interaction bar. In some embodiments, the displayed count does not exceed a certain value. For example, an aggregated interaction bar may simply indicate that at least some number (e.g., "99+") of users have interacted with the content item.

In some embodiments, the time period used to determine whether to aggregate interactions is the same as one deciding how long to display the interaction bar. In other words, if an interaction occurs before the interaction bar disappears, then an aggregated interaction bar is displayed. In some embodiments, if an aggregated interaction bar disappears and a new interaction occurs, an aggregated interaction bar is displayed with the count including the interactions described by the aggregated interaction bar that disappeared. In other embodiments, if an aggregated interaction bar disappears and a new interaction occurs, an interaction bar describing only the new interaction is displayed. In some embodiments, the viewing user can select an aggregated interaction bar to view all interactions associated with the interaction bar or to display the most recent interaction. The aggregated interaction bar may also show information about some of the users whose interactions are associated with the interaction bar. For example, the aggregated interaction bar may show the profile picture of users whose interactions are associated with the aggregated interaction bar.

Figure 7D:
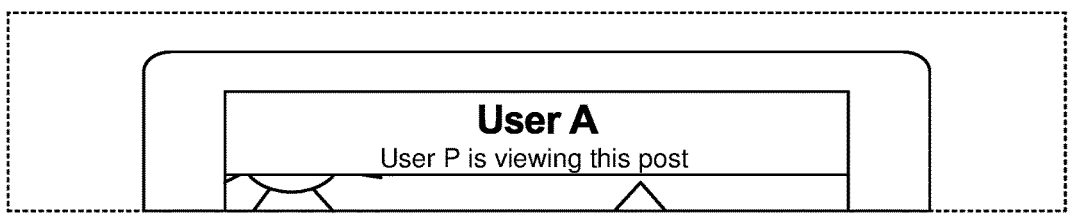

FIG. 7D illustrates a content item header that includes an interaction bar describing another user's presence on the content item page, in accordance with some embodiments. A user is present on a content item page if the user is currently viewing the content item page. In some embodiments, the viewing user can select a presence interaction bar showing a user's presence on a content item to view a page, such as a profile or feed, associated with the selected user to the viewing user. An interaction bar showing a user's presence on a content item may be shown to a viewing user based on a measure of affinity of the viewing user for the user.

Presenting an Interaction Bar to a User

Figure 8:
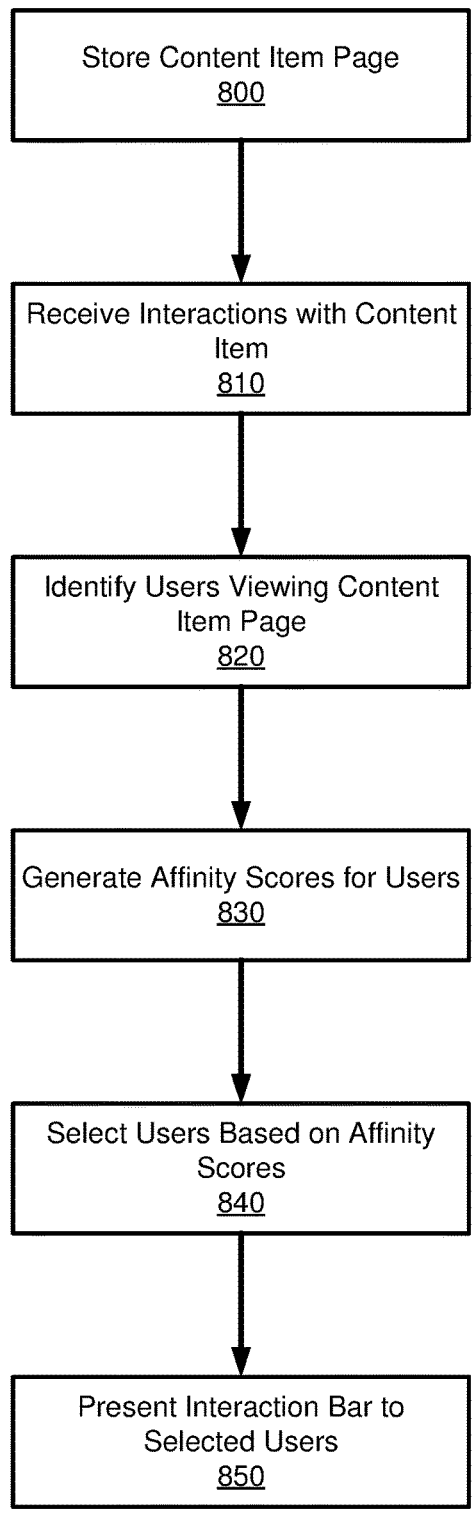
FIG. 8 is a flowchart for a method of presenting an interaction bar to a user, in accordance with some embodiments.

FIG. 8 is a flowchart for a method of presenting an interaction bar to a user, in accordance with some embodiments. Alternate embodiments may include more, fewer, or different steps, or steps performed in a different order, than what is illustrated in FIG. 8 and described below. Additionally, the steps may be performed in response to a human command or automatically without human intervention.

A social networking system stores 800 a content item page associated with a content item of the social networking system. The content item page presents the content item to the users viewing the content item page, and includes a content item header, which contains information about the content item, such as the user who generated the content item or a number of interactions that have occurred with the content item. The content item header is presented at a static position with respect to a display of the client device on which it is presented, such that a user can view different portions of the content item page and still view information presented in the content item header.

The social networking system receives 810 an interaction with the content item from a user of the social networking system. The interaction can include a reaction to the content item or a comment posted by the user on the content item. Upon receiving the interactions, the social networking system identifies 820 users that are currently viewing the content item page and generates 830 affinity scores for the identified users for the interaction. The social networking system selects 840 users to present the interaction based on the generated affinity scores and presents 850 an interaction bar in the content item header describing the interaction. The content item header with the interaction bar may be presented to the users no matter where on the content item page the users are viewing. For example, the content item header may be presented at the same position on a user's client device when the user changes the portion of the content item page that they are viewing. The interaction bar may be presented near to when the interaction occurs. For example, the interaction bar may be presented to the user as the interaction occurs, immediately after the interaction occurs, or some period of time after the interaction occurs.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   storing a content item page associated with a content item, and the content item page including a content item header containing information about the content item;
   receiving an interaction with the content item performed by a first user of a social networking system; and
   responsive to receiving the interaction:
      identifying a plurality of users that are currently viewing the content item page,
      generating an affinity score for each user of the plurality of users for the interaction,
      selecting a second user of the plurality of users that is currently viewing the content item page based on the generated affinity scores, the second user being different from the first user,
      responsive to determining that the second user is viewing a portion of the content item page that includes a top of the content item page, presenting in real-time, to the second user, an interaction bar in the content item header, the interaction bar identifying the first user, identifying the second user, and describing the interaction performed by the first user, the content item header comprising a first size; and
      responsive to determining that the second user is viewing a portion of the content item page that does not include the top of the content item page, presenting in real-time, to the second user, the interaction bar in the content item header, presenting, to the second user, the interaction bar in the content item header of the content item page, the interaction bar identifying the first user and describing the interaction performed by the first user, the content item header comprising a second size smaller than the first size.

2. The method of claim 1, wherein the interaction with the content item comprises at least one of: the first user liking the content item; the first user posting a comment on the content item; the first user interacting with a comment posted on the content item; and the first user sharing the content item with other users of the social networking system.

3. The method of claim 1, wherein identifying the first user comprises presenting a profile picture for the first user in the interaction bar.

4. The method of claim 1, wherein the interaction includes an interaction type.

5. The method of claim 4, further comprising:
   receiving, from a set of users, a set of interactions with the content item, the set of users not containing the second user, and each interaction in the set of interactions having an interaction type that is the same as the interaction type of the interaction received from the first user;
   generating an aggregated interaction bar comprising information identifying the interaction type of the interactions in the set of interactions and a count of a number of interactions in the set of interactions; and
   presenting the aggregated interaction bar to the second user in the content item header.

6. The method of claim 5, wherein the aggregated interaction bar comprises information identifying a subset of users of the set of users.

7. The method of claim 1, wherein the second user is selected based on a threshold for a measure of affinity of the second user for the interaction.

8. The method of claim 1, further comprising:
   identifying a third user of the plurality of users that is currently viewing the content item page in the social networking system; and
   presenting the interaction bar to the second user that indicates that the third user is currently viewing the content item page.

9. The method of claim 8, wherein the third user is identified based on a measure of affinity of the second user for the third user.

10. The method of claim 1, wherein the second user is selected based on a rate at which users are interacting with the content item.

11. A method comprising:
    storing a content item page associated with a content item, and the content item page including a content item header containing information about the content item;
    receiving an interaction with the content item performed by a first user of a social networking system; and
    responsive to receiving the interaction:

identifying a plurality of users that are currently viewing the content item page, generating an affinity score for each user of the plurality of users for the interaction, selecting a second user of the plurality of users that is currently viewing the content item page based on the generated affinity scores, and the second user being different from the first user, responsive to determining that the second user is viewing a portion of the content item page that includes a top of the content item page, presenting in real-time, to the second user, an interaction bar in the content item header, the interaction bar identifying the first user and describing the interaction performed by the first user, the content item header comprising a first size; and responsive to determining that the second user is viewing a portion of the content item page that does not include the top of the content item page, presenting in real-time, to the second user, the interaction bar in the content item header, presenting, to the second user, the interaction bar in the content item header of the content item page, the interaction bar identifying the first user and describing the interaction performed by the first user, the content item header comprising a second size smaller than the first size.

12. The method of claim 11, further comprising:
identifying a portion of the content item page that the second user is currently viewing; and
adjusting the content item header based on the identified portion that the second user is currently viewing.

13. The method of claim 11, wherein identifying the first user comprises presenting a profile picture for the first user in the interaction bar.

14. The method of claim 12, wherein the second user is selected based on a threshold for a measure of affinity of the second user for the interaction.

15. The method of claim 12, further comprising:
identifying a third user of the plurality of users that is currently viewing the content item page in the social networking system; and
presenting an interaction bar to the second user that indicates that the third user is currently viewing the content item page.

16. The method of claim 12, wherein the second user is selected based on a rate at which users are interacting with the content item.

* * * * *